Patented May 8, 1928.

1,668,740

UNITED STATES PATENT OFFICE.

LESLIE R. STEELE, OF BOULDER, COLORADO.

BATTERY ELECTROLYTE COMPOUND.

No Drawing.  Application filed March 2, 1922. Serial No. 540,659.

The electrolyte consists of compound made from ammonium sulphate, sodium silicate, turpentine, starch, and water. The compound is most useful and produces the best results when mixed or compounded in the proportions hereinafter described, namely:

To seventy (70) parts of sodium silicate add two (2) parts of a solution of equal parts turpentine and starch. Mix thoroughly. Add slowly twenty-eight (28) parts of powdered ammonium sulphate, the mixture being vigorously stirred while the ammonium sulphate is being added. While the ammonium sulphate is being added the mass solidifies and hardens. The compound is then powdered to the fineness of flour and thirty (30) parts of water added, thoroughly stirred, and allowed to digest seventy-two (72) hours.

As the inventor or discoverer, I am well aware that the above proportions may be varied; that the one above set forth and described has been used and thoroughly tested; that the time allowance for digesting may be varied with satisfactory results.

The manner or method in which the compound may be used is, for example, in an automobile wet storage battery, namely: Discharge the storage battery down to a voltage approximating 1.7, remove the sulfuric acid and add the compound, which has been digested with water as above described, sufficient to cover the plates. The storage battery is then ready for recharging in the usual manner. During the process of recharging, the compound solidifies, and some liquid is driven to the top which may be drawn off and discarded. Sufficient compound should be added in order that the solid mass completely covers the plates.

A dry storage battery is thus produced by the substitution of the compound for the sulfuric acid, and the compound so substituted for the sulfuric acid acts as an electrolyte and functions in such a manner as to give the same results as did the sulfuric acid in the wet storage battery.

Any wet storage battery known to commercial use can be treated in the same way and satisfactory results obtained.

It is possible that by the use of properly prepared plates, a commercially useful storage battery can be made by the use of this compound without the necessity of first making a wet storage battery.

What I claim is:

An electrolyte composition to be substituted for sulfuric acid in a Planté type storage battery, comprising a suspension in water of a powdered compound formed from a soluble silicate and ammonium sulphate.

In testimony whereof I affix my signature this 27th day of February, A. D. 1922.

LESLIE R. STEELE.